United States Patent [19]

Buccicone

[11] Patent Number: 5,732,734
[45] Date of Patent: Mar. 31, 1998

[54] PLUMBING VALVE

[75] Inventor: Dana F. Buccicone, Goshen, Ind.

[73] Assignee: Sterling Plumbing Group, Inc., Rolling Meadows, Ill.

[21] Appl. No.: 545,489

[22] Filed: Oct. 19, 1995

[51] Int. Cl.⁶ ............................................. F16K 27/04
[52] U.S. Cl. .................................. 137/454.6; 137/625.31
[58] Field of Search ........................ 137/454.6, 625.3, 137/625.31, 625.32

[56] References Cited

U.S. PATENT DOCUMENTS

| | | | |
|---|---|---|---|
| 3,279,746 | 10/1966 | Arnold, Jr. | 251/214 |
| 3,698,418 | 10/1972 | Schmitt | 137/454.6 |
| 3,831,621 | 8/1974 | Anthony et al. | 137/270 |
| 3,913,612 | 10/1975 | Tolnai | 137/454 |
| 4,005,728 | 2/1977 | Thorp | 137/270 |
| 4,015,817 | 4/1977 | Argyris et al. | 251/288 |
| 4,064,904 | 12/1977 | Tolnai | 137/454 |
| 4,325,403 | 4/1982 | Uhlmann | 137/315 |
| 4,362,186 | 12/1982 | Parkison et al. | 137/625 |
| 4,425,935 | 1/1984 | Gonzalez | 137/315 |
| 4,557,288 | 12/1985 | Botnick | 137/454.5 X |
| 4,584,723 | 4/1986 | Hussauf | 4/192 |
| 4,651,770 | 3/1987 | Denham et al. | 137/270 |
| 4,793,375 | 12/1988 | Marty | 137/270 |
| 4,804,011 | 2/1989 | Knapp | 137/270 |
| 4,821,765 | 4/1989 | Iqbal et al. | 137/270 |
| 4,887,642 | 12/1989 | Bernat | 137/625 |
| 4,901,749 | 2/1990 | Hutto | 137/270 |
| 4,903,725 | 2/1990 | Ko | 137/454.5 |
| 4,922,950 | 5/1990 | Taylor | 137/316 |
| 4,942,902 | 7/1990 | Knapp | 137/625 |
| 5,010,917 | 4/1991 | Iqbal | 137/454 |
| 5,020,568 | 6/1991 | Taylor | 137/454.6 X |
| 5,094,258 | 3/1992 | Orlandi | 137/454 |
| 5,107,884 | 4/1992 | Orlandi | 137/454 |
| 5,331,997 | 7/1994 | Bosio | 137/270 |

FOREIGN PATENT DOCUMENTS 0 003 459  8/1979  European Pat. Off. .

Primary Examiner—Stephen M. Hepperle
Attorney, Agent, or Firm—Quarles & Brady

[57] ABSTRACT

A cartridge type valve is provided. In one embodiment, the valve has an off center inlet yet still permits a rotatable engagement between a bonnet and the side walls of the lower portion of the valve cartridge. In another embodiment, post members afford a stop surface for a rotatable stem, a vertical stop for a bonnet member, as well as orientation for a stationary valve element. A right and left-hand conversion is also provided by cross-shaped projections on the end of the stem and slots in a movable valve element.

12 Claims, 7 Drawing Sheets

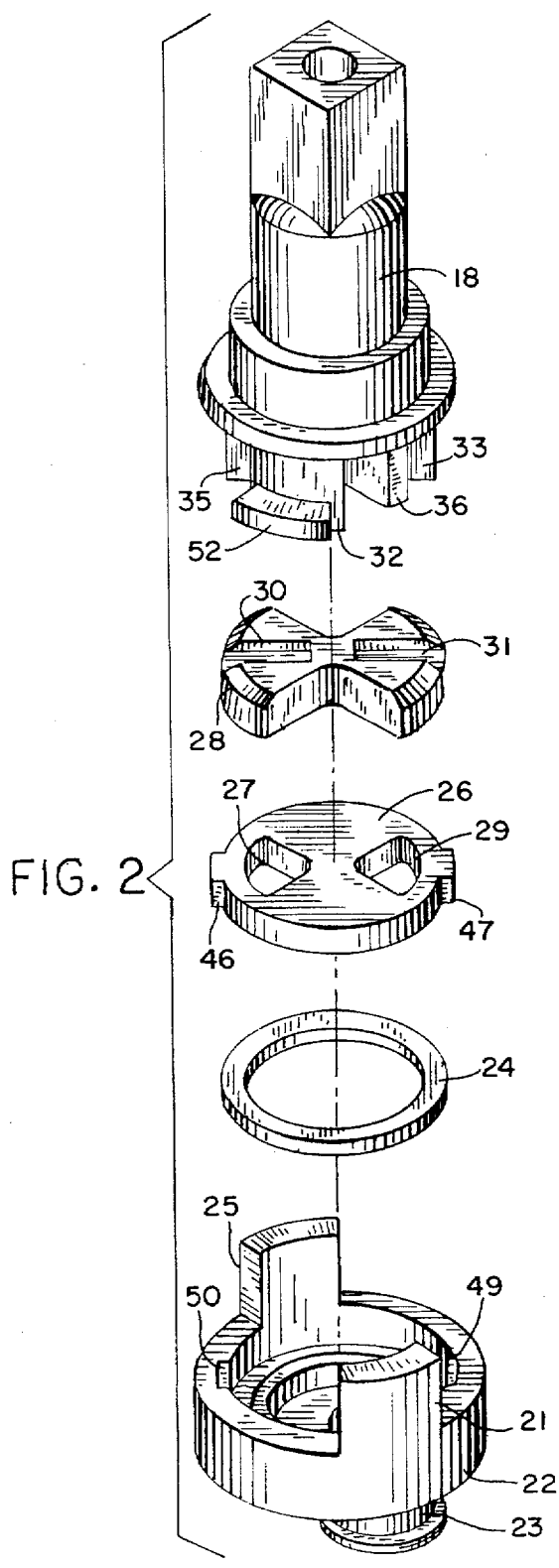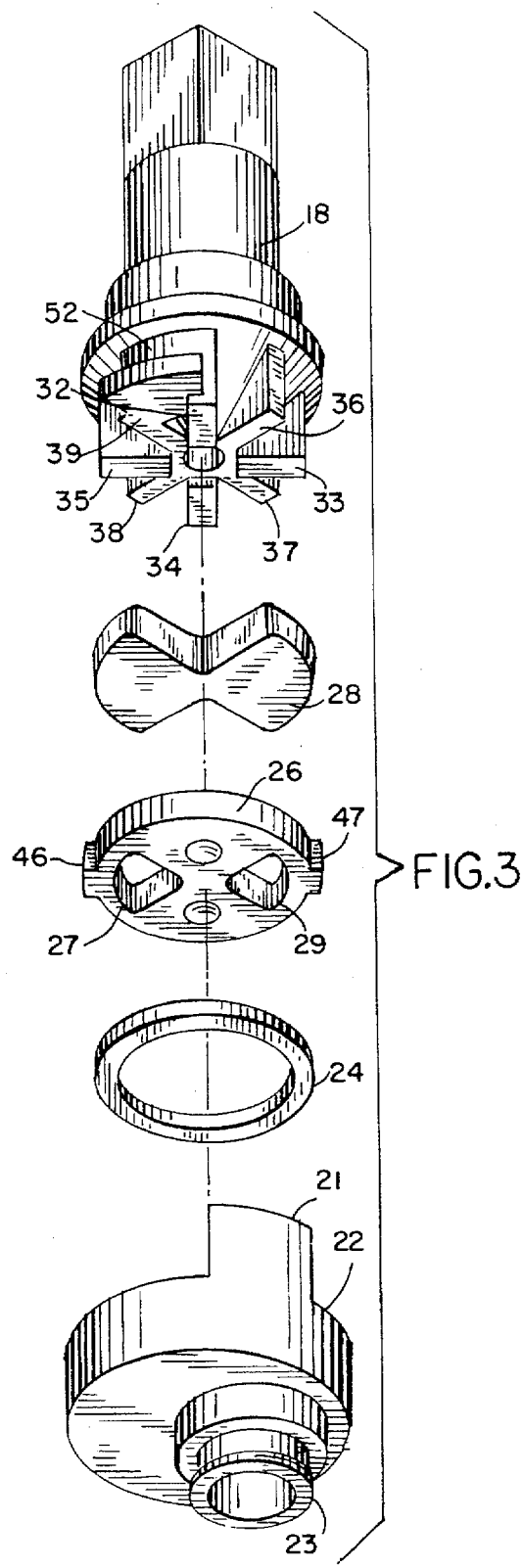
FIG. 2
FIG. 3

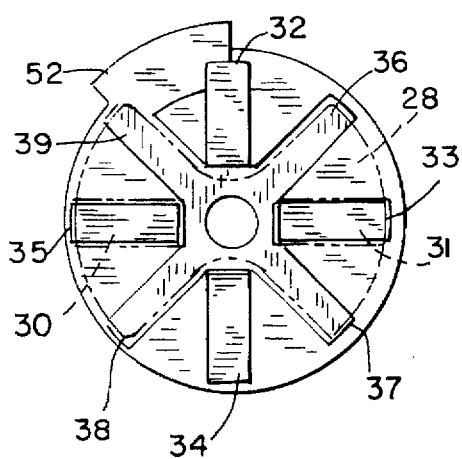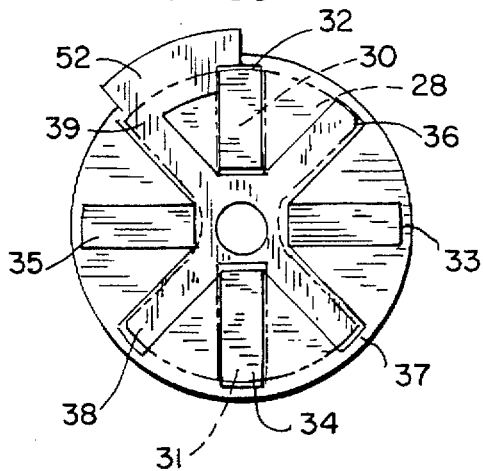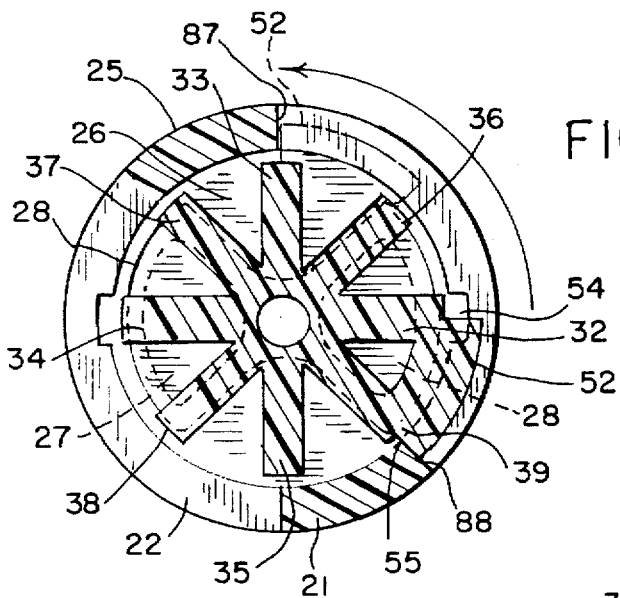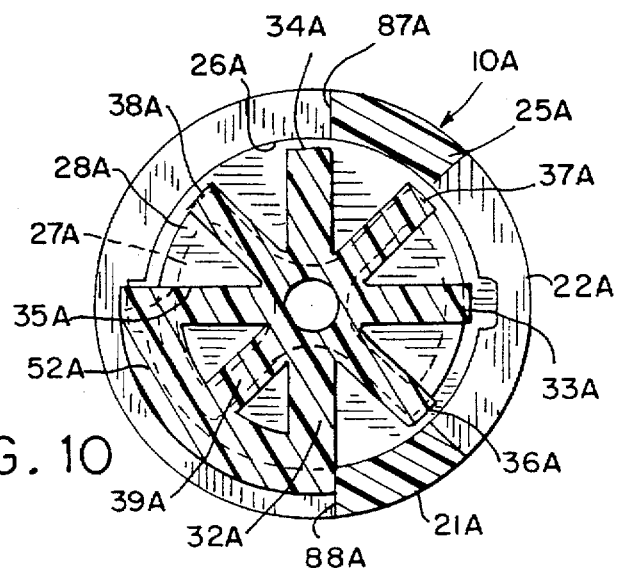

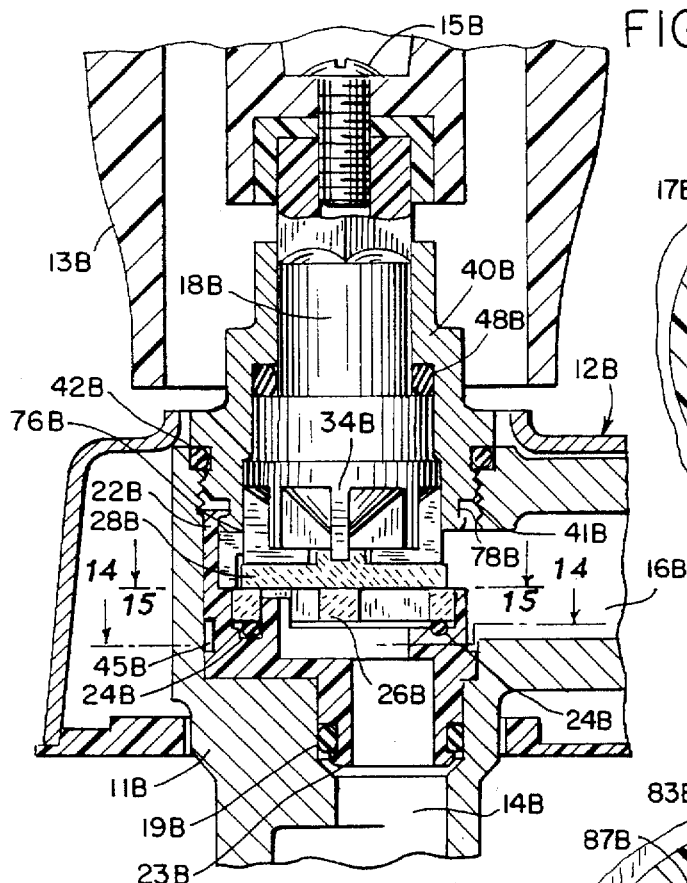
FIG. 13
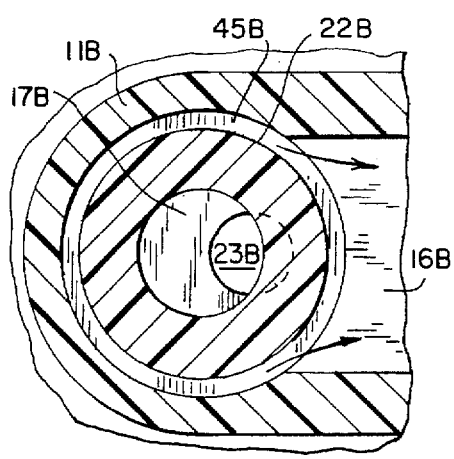
FIG. 14
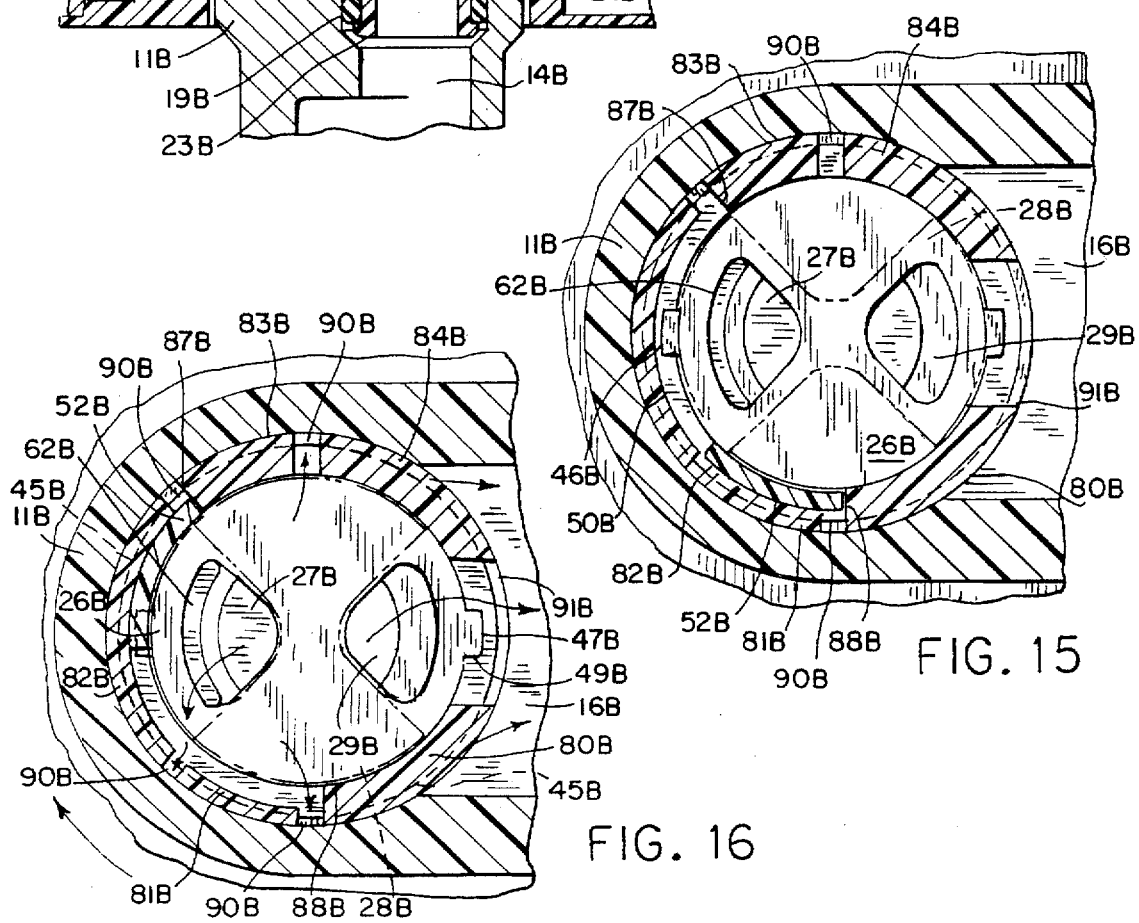
FIG. 15
FIG. 16

PLUMBING VALVE

BACKGROUND OF THE INVENTION

A. Field of the Invention

This invention relates primarily to valve housings such as faucets which use replaceable valve cartridges. It is especially well suited for use with off-center inlet systems.

B. Description of the Art

Cartridge type valves are shown in U.S. Pat. Nos. 4,005, 728; 4,425,935; 4,804,011; 4,901,749 and 5,331,997. However, the faucet valves disclosed in these patents do not permit rotation of the bonnet when the valve cartridge is in place in a valve body having an off-center inlet.

There are also a wide variety of "non-rise" ceramic disk cartridge valve units available. For example, see U.S. Pat. Nos. 3,831,621; 4,651,770; and 4,821,765. As indicated in these patents, these valve units require valve body members or sleeves for housing the valve parts. This necessitates the use of large quantities of metal or plastic and adds to the expense of the valve.

Another problem associated with valves of this type is the requirement of multiple component parts such as drive members placed between the stem and the movable ceramic plate in order to rotate it. In other instances, special extra stops must be provided in the valve bodies to limit rotation of the stem. In others, the movable valve plates are constructed with large quantities of ceramic to afford a right-hand/left-hand convertibility.

SUMMARY OF THE INVENTION

In one embodiment, the invention provides a removable cartridge valve for use in a valve housing, the housing having an inlet in its bottom and an outlet. The cartridge valve has a valve bonnet member having an axial bore and a cup member having side wall elements for assembly with the bonnet member in a flange and groove relationship to provide a rotatable engagement therebetween but with relative axial movement between the two restricted. The cup member has a downwardly projecting tubular inlet for telescoping communication with the housing inlet and an exit for fluid communication with the housing outlet. A movable valve element is positioned in the cup member. A rotatable stem is sealed within an upper end of the axial bore of the valve bonnet member, the stem having one end extending outside the bonnet member, and another end connected to the movable valve element for regulating fluid flow through the valve in response to rotation of the rotatable stem. The valve is constructed and arranged so that the valve bonnet member can be rotated with respect to the cup member after the cartridge is positioned in the valve housing.

In one aspect, the cup member has an axially offset downwardly projecting tubular inlet for telescoping engagement with the inlet in the bottom of the housing and providing for an exit in the cup member for fluid communication with the housing outlet. A stationary valve element and a movable valve element are both positioned in the cup member for regulating fluid flow through the valve in response to rotation of the movable element over the stationary element. A rotatable stem is sealed within an upper end of the axial bore of the bonnet member, the stem having one end extending outside the bonnet member and the other end connected to the movable valve element. The valve is constructed and arranged so that the valve bonnet can be rotated with respect to the cup member after the cup member is placed in the valve housing with the axially offset tubular inlet placed in the housing inlet.

In another aspect, the valve bonnet has a peripheral groove and the side wall elements have a flange to provide the flange and groove relationship for the rotatable engagement.

In another embodiment, the cup member has post elements for contact with the bonnet member. The valve is constructed and arranged so that the post elements afford a stop surface for a radially extending projection, a vertical stop for the bonnet member and an orientation for the stationary valve element with respect to the post elements.

In all of the embodiments, the side wall and post elements include stop surfaces for a stop member connected to the rotatable stem.

In another preferred form, the other end of the stem has projecting members positioned in locations in addition to 180° capable of receiving a slot in the movable valve element in at least two different orientated positions for right- and left-hand conversion by selective placement of different projecting bar member in the same slot.

The objects of the invention therefore include:

a. providing a faucet valve cartridge of the above kind which affords ease of assembly and installation;

b. providing a faucet valve of the above kind which reduces component parts;

c. providing a faucet valve of the above kind which can be easily retrofitted;

d. providing a faucet valve of the above kind which can be readily converted to either counter-clockwise or clockwise operation; and e. providing a faucet valve of the above kind which can be produced at low cost.

These and still other objects and advantages of the invention will be apparent from the description which follows. In the detailed description below, preferred embodiments of the invention will be described with reference to the accompanying drawings. The embodiments do not represent the full scope of the invention. Rather the invention may be employed in other embodiments. Thus, the claims should be looked to in order to judge the scope of the invention.

BRIEF DESCRIPTION OF THE DRAWINGS

FIG. 2 is an exploded perspective view of the faucet valve parts shown in FIG. 1;

FIG. 3 is a view similar to FIG. 2 except from a lower angle;

FIG. 7 is a bottom view of the valve illustrating the positioning of the movable valve element in conjunction with the valve stem;

FIG. 8 is a view similar to FIG. 7 showing the movable valve element in a different position on the valve stem;

FIG. 9 is a view similar to FIGS. 5 and 6 except showing the valve stem in a different position;

FIG. 10 is a view similar to FIG. 9 showing a second embodiment of the valve stop member;

FIG. 13 is a view similar to FIG. 1 illustrating the embodiment of FIG. 11;

FIG. 14 is a sectional view taken along line 14—14 of FIG. 13;

FIG. 15 is a sectional view taken along line 15—15 of FIG. 13;

FIG. 16 is a view similar to FIG. 15 illustrating the valve in a different operating position;

DESCRIPTION OF THE PREFERRED EMBODIMENTS

Figure 1:
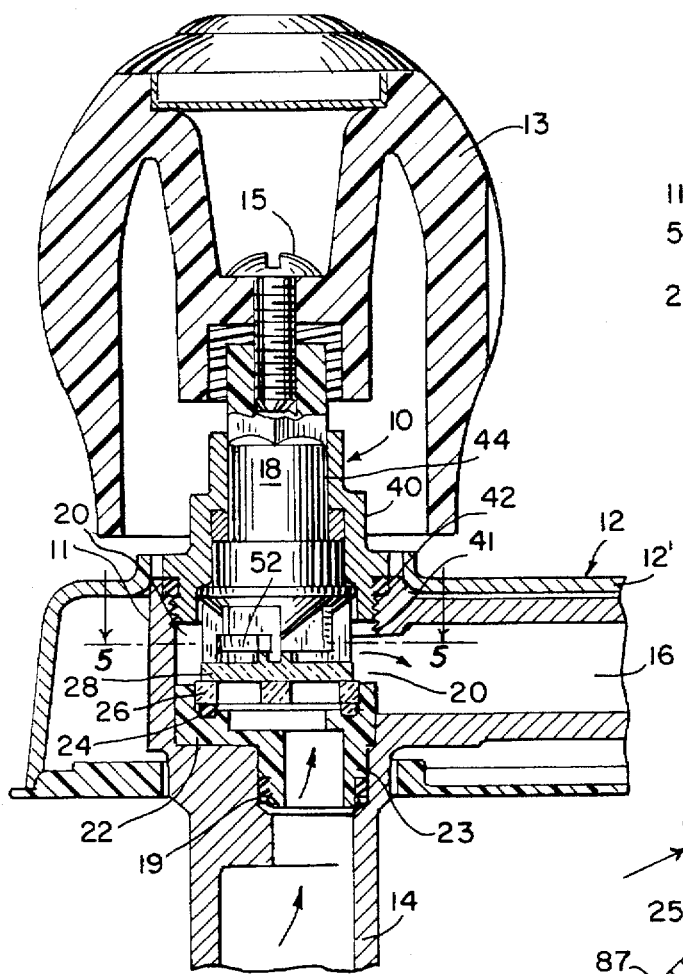
FIG. 1 is a view in vertical cross section showing the faucet valve of this invention operatively connected to a water inlet and a manifold.
Figure 4:
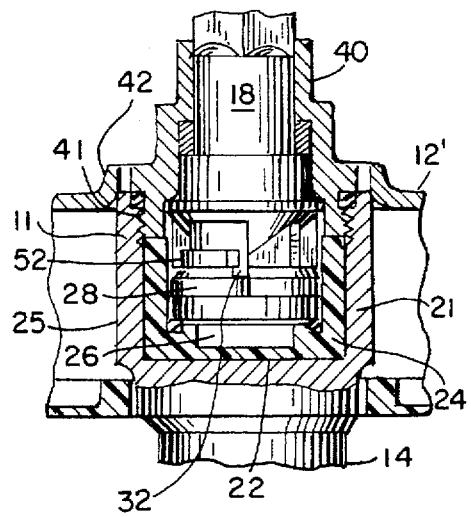
FIG. 4 is a sectional view taken along line 4—4 of FIG. 5.

Referring to FIG. 1, the plumbing valve 10 generally is shown in conjunction with a manifold 12 having a water inlet portion 14, a channel 16 and a trim portion 12 The faucet valve 10 has a tubular inlet portion 23 with seal 19 and a water outlet portion 20. The directional arrows in FIG. 1 illustrate the pathway of water through the valve from the inlet 14 up through the valve to the side outlets 20 into the channel 16 which leads to the usual spout (not shown). A handle 13 is connected to a valve stem 18 by the screw 15.

A lower disk cup 22 is seated in a valve body 11 formed as a part of manifold 12. Disk cup 22 houses the stationary disk 26 of the ceramic type and a seal 24. A movable ceramic disk 28 is positioned over the stationary disk 26 and, as seen in FIG. 2, has the usual openings 27 and 29 for controlling the flow of water therethrough. There are grooves 30 and 31 in the movable disk 28 for receiving vanes such as 32 which extend from the end of stem 18 as will be more fully explained later in the description. A bonnet 40 having the bore 44 receives a portion of the stem 18 and a seal 42 is placed between the bonnet 40 and the valve body 11 as well as a seal 48 between stem 18 and bonnet 40. Bonnet 40 is retained in the valve body 11 by the threads 41.

Figure 5:
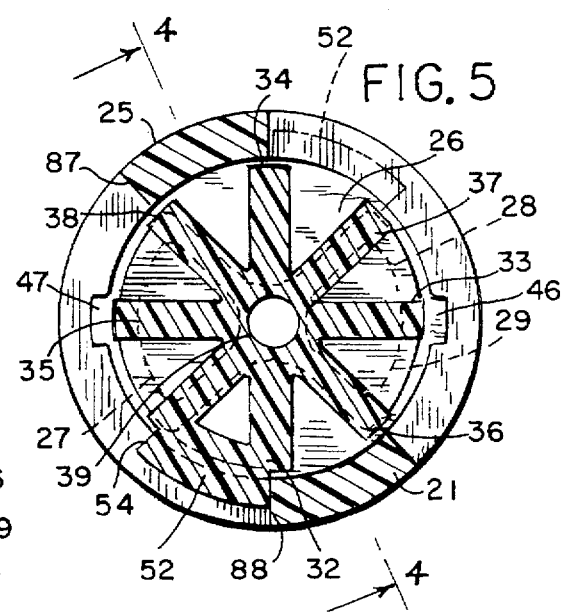
FIG. 5 is a sectional view taken along line 5—5 of FIG. 1.
Figure 6:
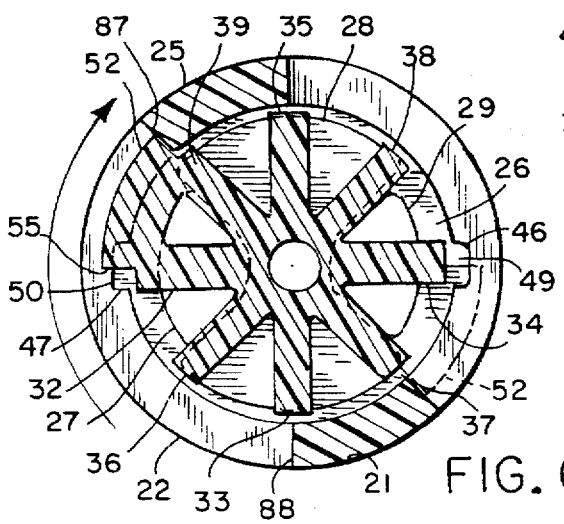
FIG. 6 is a view similar to FIG. 5 illustrating a different position of the valve.

As seen in FIGS. 5 and 6, the stationary disk 26 is positioned and orientated in the lower disk cup 22 by the tabs 46 and 47 engaging in the slots 49 and 50, respectively.

Referring to FIGS. 3, 7 and 8, there are four vanes or bar members 32–35 and four flanges 36–39 extending alternately from the bottom of stem 18. Vanes 32–35 provide an easy adaptation of the faucet valve 10 to a right hand or left hand orientation. Referring specifically to FIGS. 2 and 7 vanes 33 and 35 engage grooves 30 and 31 respectively of moveable disk 28. This for example could be a right-hand orientation. In order to convert it to a left-hand, the movable disk is rotated 90 degrees so that the grooves 30 and 31 are now engaged by the vanes 32 and 34 as shown in FIG. 8.

As seen in FIGS. 4–6 and 9, extending between vane 32 and flange 39 is a stop member 52 providing stop surfaces 54 and 55. These stop surfaces 54 and 55 engage the stop surfaces 87 and 88 of posts 25 and 21 extending upwardly from the lower disk cup 22. These act as a stop for the rotation of stem 18. FIGS. 5 and 6 represent the valve in a left-hand operation and FIG. 9 a right-hand one. The stop member 52 shown in broken lines in FIG. 5 is for illustrating the alternative positioning of the stop member between the posts 21 and 25.

FIGS. 10–22 represent additional embodiments wherein similar parts are designated by the same number except with the suffixes A, B and C. Referring to embodiment 10A of FIG. 10, one of the differences between this embodiment and 10 is in the positioning of the posts 21A and 25A. These posts are positioned in an asymmetrical manner with respect to the cup disk 22A. In some instances where a retrofit is desired, the offset legs may be of an advantage. Another difference between embodiments 10 and 10A is the larger stop member 52A. It extends from vane 32A to vane 35A with flange 39A therebetween. This affords a more durable stop member. Stop surfaces 87A and 88A are provided by posts 25A and 21A for stop member 52A.

An important feature of the valves 10 and 10A are that they do not require the usual valve housing. Instead, the 20 disk cup such as 22 serves the function of housing the movable and stationary disks 28 and 26, respectively, and the upwardly extending posts 21 and 25 as well as 21A and 25A to provide a contact with the bonnet 40 so as to limit its movement downwardly toward the disk cup. This affords the side open spaces 20 therebetween for the water to flow outwardly after being regulated through the disk plates. Not only do the posts 21, 25 and 21A, 25A serve as positioning means for the bonnet 40 as previously indicated, they also serve as a stop for rotation of the stem 18. A third function provided by the posts 21, 25 and 21C, 25C is the orientation of the stem 18 with respect to the stationary disk 26.

Figure 11:
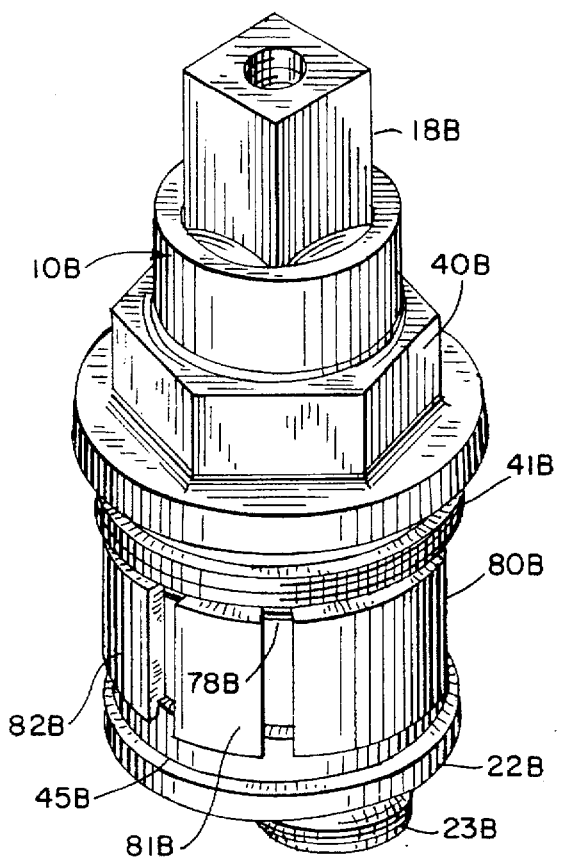
FIG. 11 is a perspective view of a third embodiment of the faucet valve.
Figure 12:
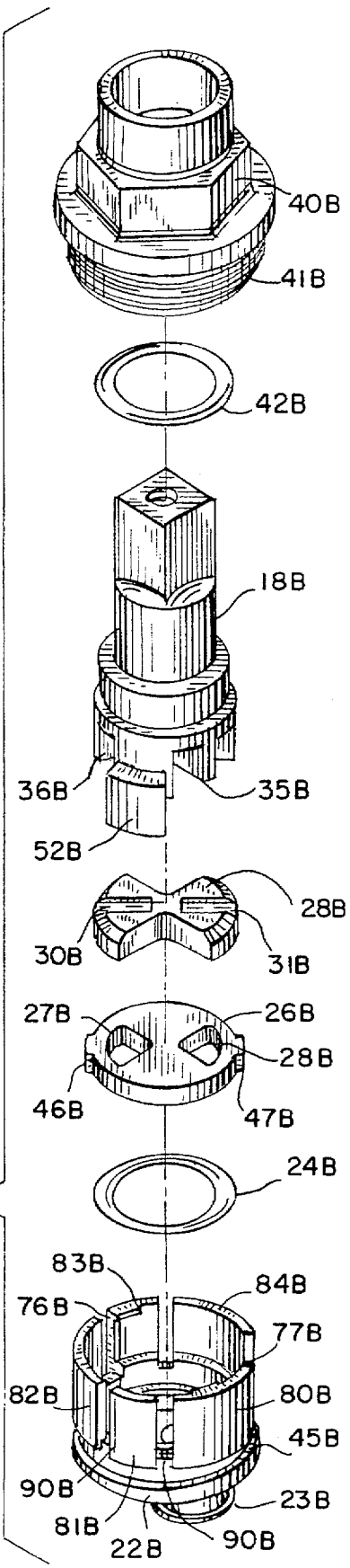
FIG. 12 is a view similar to FIG. 2 illustrating the component valve parts for the valve shown in FIG. 11.
Figure 17:
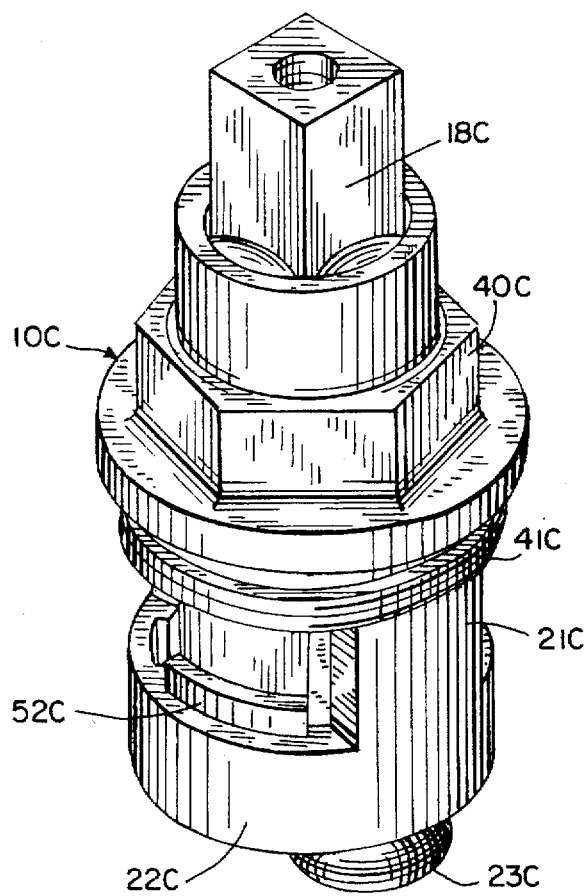
FIG. 17 is a view similar to FIG. 11 illustrating a fourth embodiment.

A third alternative embodiment and that which is preferred is described in FIGS. 11–16 as embodiment generally 10B. This embodiment, unlike embodiments 10 and 10A, and as seen in FIG. 12 has a multiplicity of sidewalls 80B-84B instead of the two posts 21 and 25.

Referring specifically to FIGS. 12 and 13, the sidewalls 80B and 83B have ribs 77B and 76B extending inwardly therefrom. These engage a groove 78B in the bonnet 40B to provide a snap fitment and rotatable engagement of the bonnet 40B with the lower disk cup 22B.

Another difference is the flow path of water through the valve which passes between the sidewalls 80B–84B and through the slots 90B. These slots 90B communicate with a circumferential groove 45B which is seen in FIGS. 11 and 12 in the lower disk cup 22B. Thus, when the lower disk cup 22B is placed in the valve body 11B, water flowing through the openings 27B and 29B of disk 26B flows through slots 90B and around the groove 45B where it exits between sidewalls 80B and 84B by means of passage 91B and into channel 16B. This is best visualized in conjunction with the directional arrows shown in FIG. 16.

Another distinguishing feature of embodiment 10B is the use of a guidepost 62B which extends upwardly from the base portion of lower disk cup 22B. This is seen in FIGS. 15 and 16. It has an arcuate configuration and fits into the opening 27B of disk 26B for purposes of orientation. This is in addition to the use of the tabs 46B and 47B on disk 26B and the slots 50B and 49B in the disk cup 22B. The guidepost not only serves as an orientation means but also as a backup in the event the tabs 46B and 47B or slots 50B and 49B fail.

FIGS. 15 and 16 also illustrate the stop feature for the stem 18B. The stop member 52B pivots between the sidewalls 80B and 83B which have extending wall surfaces to provide stops 88B and 87B.

FIG. 14 illustrates the offset positioning of tubular inlet 23B with respect to the lower disk cup 22B and inlet portion 17B of the disk cup 22B. With this offset tubular inlet arrangement, the ability of the bonnet 40B to be rotated once the lower disk cup 22B is placed in valve body 11B becomes all the more essential.

Figure 18:
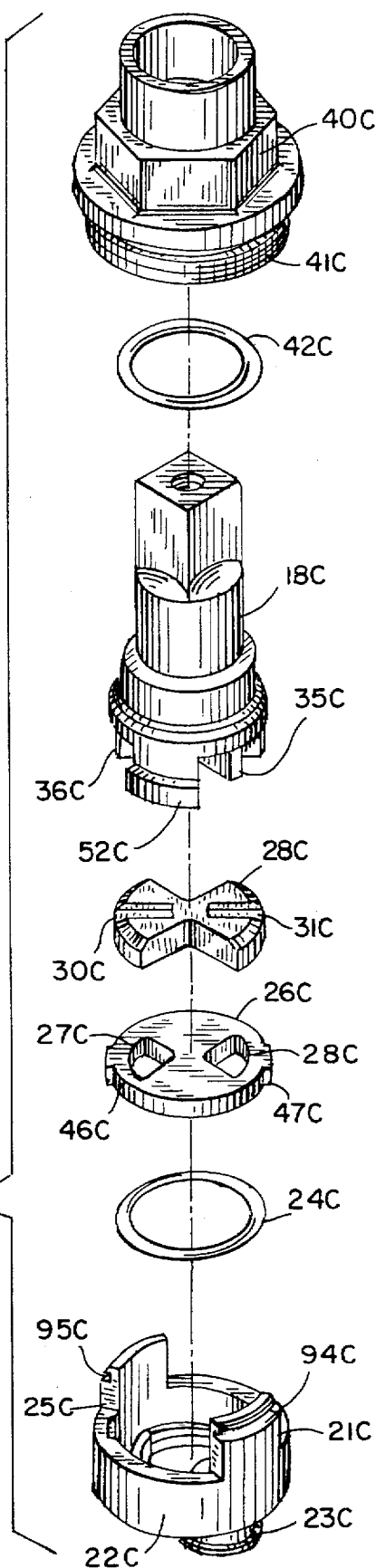
FIG. 18 is a view similar to FIG. 2 showing the component parts of the valve of FIG. 17.
Figure 19:
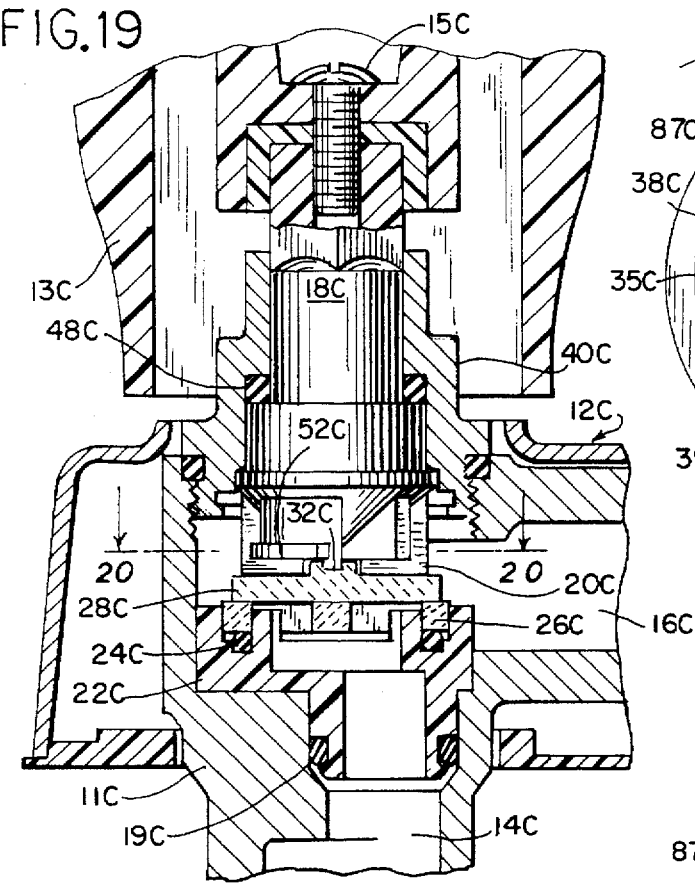
FIG. 19 is a view similar to FIG. 1 illustrating the valve of FIG. 17.
Figure 22:
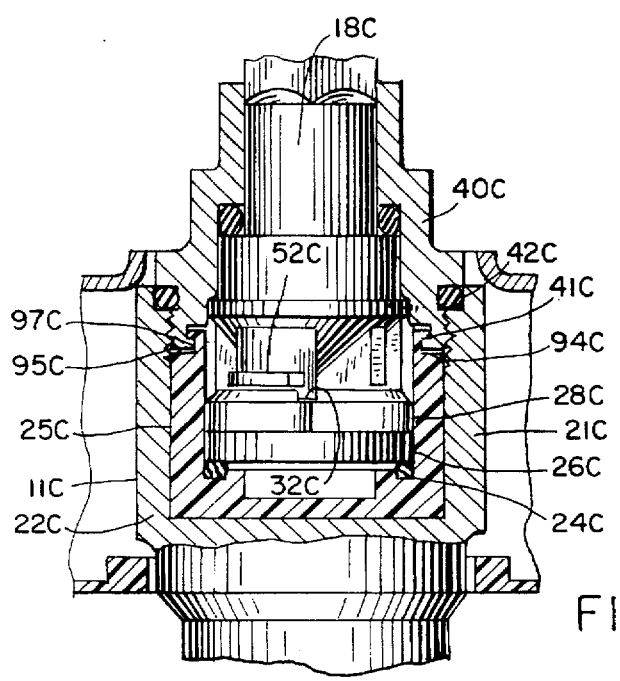
FIG. 22 is a sectional view taken along line 22—22 of FIG. 20.

Embodiment 10C is illustrated in FIGS. 17–22. This embodiment has features of both embodiments 10 and 10B. For example, it has the opposing posts 21C and 25C but it also includes a snap fit and rotatable engagement with the bonnet 40C. This is effected by the undercuts 94C and 95C in the posts 21C and 25C as illustrated in FIGS. 18 and 22. These engage the circumferential flange 97C on the bonnet 40C as seen in FIG. 22.

Figure 20:
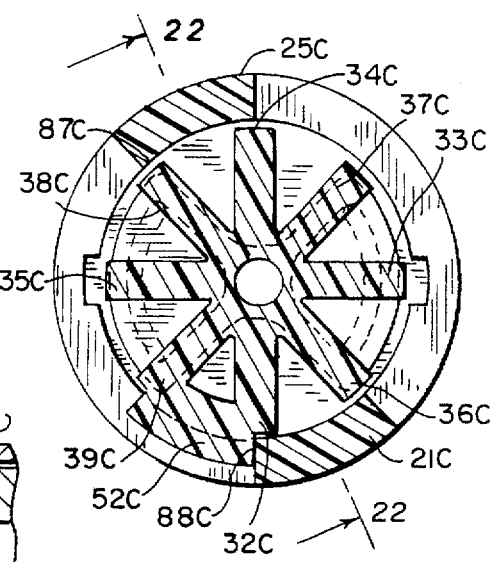
FIG. 20 is a sectional view taken along line 20—20 of FIG. 19.
Figure 21:
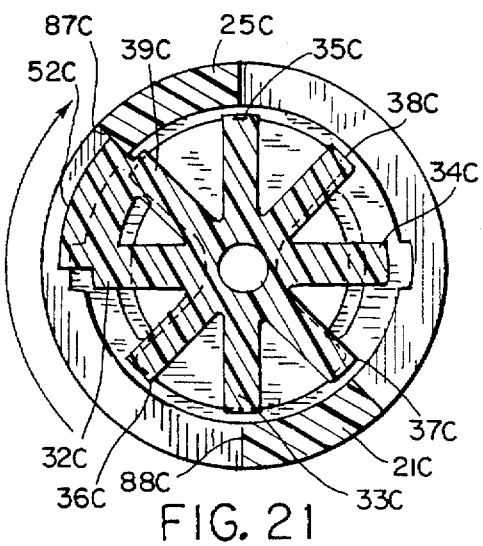
FIG. 21 is a view similar to FIG. 20 showing the faucet valve in another mode of operation.

FIGS. 20 and 21 illustrate the stop feature for stop member 52C and the stop surfaces 88C and 87C of posts 21C and 25C.

Thus, the invention provides an improved valve. While the preferred embodiments have been described above, it is readily apparent to those skilled in the art that other modifications and changes may be made without departing from the spirit and scope of the invention. For example, while a right-hand/left-hand conversion is provided by vanes 32B–35B and 32C–35C in conjunction with the snap together feature for the bonnets 40B and 40C and the respective disk cups 22B and 22C, the extra pair of vanes can be eliminated and still accomplish the advantage of a rotatable bonnet. A single guidepost 62B is described for use with stationary disk 26B. Two guideposts could be employed in a manner such that each opening 27B and 28B has one extending therein. Alternately, the guidepost 62B can be eliminated as well as the circumferential groove 45B although the efficiency of the faucet valve 10B can be affected. Further, in place of the ceramic disks such as 28 and 29, a washer type faucet can be employed with any of the previously described embodiments. In addition, while a faucet has been shown, the valve can be used with other types of fluid valves. Also, the specific materials mentioned are not the only materials which can be used. All such and other modifications within the spirit of the invention are meant to be in the scope thereof.

What is claimed is:

1. A removable cartridge valve for use in a valve housing, the housing having an inlet in its bottom and an outlet, the cartridge valve comprising:
   a valve bonnet member having an axial bore;
   a cup member having side wall elements for assembly with the bonnet member, the cup member having an axially offset downwardly projecting tubular inlet for telescoping engagement with the inlet in the bottom of the housing and providing for an exit in the cup member for fluid communication with the housing outlet;
   a movable valve element positioned in the cup member for regulating fluid flow through the valve;
   a rotatable stem sealed within an upper end of the axial bore of the bonnet member, the stem having one end extending outside the bonnet member and the other end connected to the movable valve element;
   the cup member interfitting with the valve bonnet member in a manner so that the valve bonnet member can be rotated with respect to the cup member after the cup member is placed in the valve housing with the axially offset tubular inlet placed in the housing inlet.

2. A removable cartridge valve for use in a valve housing, the housing having an inlet in its bottom and an outlet, the cartridge valve comprising:
   a valve bonnet member having an axial bore;
   a cup member having side wall elements for assembly with the bonnet member, the cup member having an axially offset downward projecting tubular inlet for telescoping engagement with the inlet in the bottom of the housing and providing for an exit in the cup member for fluid communication with the housing outlet;
   a stationary valve element and a movable valve element both positioned in the cup member for regulating fluid flow through the valve in response to rotation of the movable element over the stationary element
   a rotatable stem sealed within an upper end of the axial bore of the bonnet member, the stem having one end extending outside the bonnet member and the other end connected to the movable valve element;
   the valve being constructed and arranged so that the valve bonnet member can be rotated with respect to the cup member after the cup member is placed in the valve housing with the axially offset tubular inlet placed in the housing inlet, the valve bonnet and the side wall elements fitting together in a flange and groove relationship.

3. The valve of claim 2, wherein the groove is positioned radially externally of the bonnet member and the flange is positioned on at least one of the side wall elements facing inwardly with respect to the cup member.

4. The valve of claim 2, wherein the stationary valve element includes apertures for water passage and the cup member includes at least one guidepost for positioning in at least one of the apertures of the valve element.

5. The valve of claim 2, wherein the cup member includes a peripheral groove for the passage of water from the exit in the cup member.

6. The valve of claim 2, wherein the side wall elements include stop surfaces for a stop member connected to the rotatable stem.

7. The valve of claim 2, wherein the rotatable stem has an end with projecting bar members, the projecting bar members positioned in locations in addition to 180° and the movable disk has at least one slot for reception of the bar members, so that a conversion of the valve from a right-hand valve to a left-hand valve or vice-versa can be effected by selective placement of different projecting bar members in the same slot.

8. A removable cartridge valve for use in a valve housing or the like, the housing having an inlet in its bottom and an outlet, the cartridge valve comprising:
   a valve bonnet member having an axial bore;
   a cup member having post elements for contact with the bonnet member, the cup member also having an opening for fluid communication with the inlet in the bottom of the housing and at least one exit in the cup member for fluid communication with the outlet of the housing;
   a stationary valve element and a movable valve element both positioned in the cup member for regulating fluid flow through the valve in response to rotation of the movable element over the stationary element;
   a rotatable stem sealed within an upper end of the axial bore of the valve bonnet member, the stem having one end extending outside the bonnet member and the other end connected to the movable valve element, the stem also having a radially extending projection;

the valve being constructed and arranged so that the post elements afford a stop surface for the radially extending projection, a vertical stop for the bonnet member, and an orientation for the stationary valve element with respect to the post elements.

9. The valve of claim 8, wherein an end of the stem connected to the movable valve element has spaced apart projecting members capable of receiving the movable valve element in at least two different orientated positions.

10. The valve of claim 9, wherein the projecting members are positioned essentially 90° apart.

11. The valve of claim 9, wherein the movable valve element has two spaced apart grooves for receiving the projecting members.

12. The valve of claim 8, wherein there are two post members spaced asymmetrically with respect to the cup member.

* * * * *